UNITED STATES PATENT OFFICE.

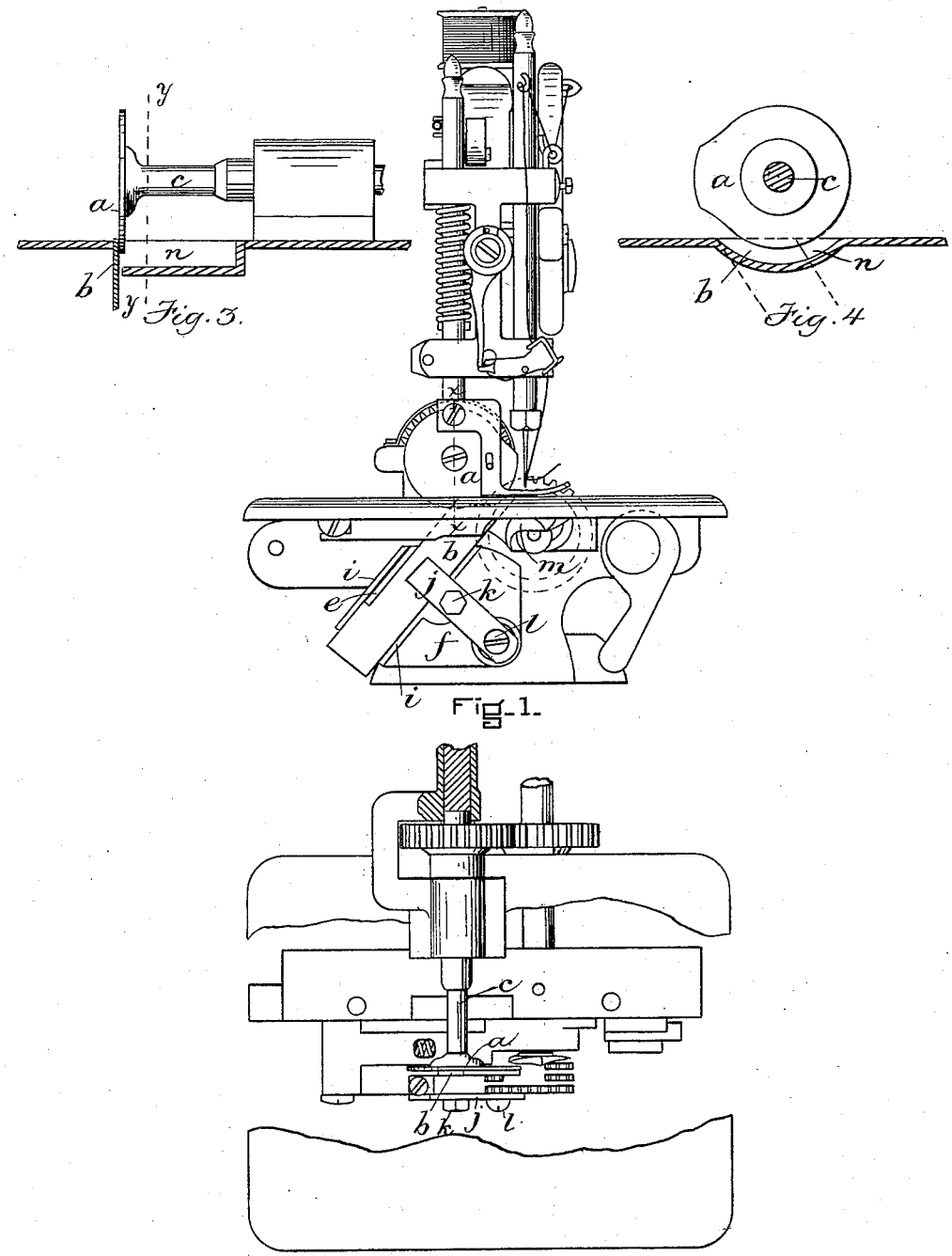

THOMAS C. ROBINSON, OF BOSTON, ASSIGNOR OF ONE-HALF TO E. B. WELCH, OF CAMBRIDGE, MASSACHUSETTS.

TRIMMING MECHANISM FOR SEWING MACHINES.

SPECIFICATION forming part of Letters Patent No. 317,419, dated May 5, 1885.

Application filed February 15, 1884. (No Model.)

*To all whom it may concern:*

Be it known that I, THOMAS C. ROBINSON, of Boston, in the county of Suffolk and State of Massachusetts, have invented certain Improvements in Trimming Mechanism for Sewing-Machines, of which the following is a specification:

This invention relates to trimming mechanism for sewing-machines, composed of a blade or cutting-edge affixed to the bed of the machine and a co-operating moving blade operated by the power of the machine, said blades trimming the material being stitched in a line parallel with the line of stitches.

The invention has for its object, first, to provide an improved fixed blade, and means for securing the same, whereby the blade may be adjusted to compensate for wear of its cutting-edge, and its usefulness preserved much longer than heretofore.

The invention also has for its object to provide means for preventing the scraps and lint formed by the cutting action from finding their way below the throat-plate or bed of the machine, and obstructing or impeding the action of the stitch-forming mechanism below said throat-plate or bed.

To these ends my invention consists, first, in an elongated fixed blade, arranged to present one of its ends as a cutting surface and supporting and holding devices for said blade, whereby it is adapted to be moved endwise to compensate for wear and positively held at any position to which it may be adjusted.

The invention consists, secondly, in the provision of a depression in the throat-plate or bed of the machine, arranged to receive the scraps and lint formed by the action of the cutters and prevent them in a great measure from being forced by the moving blade downwardly through the slot in the throat-plate beside the fixed blade, all of which I will now proceed to describe.

Of the accompanying drawings forming a part of this specification, Figure 1 represents an end elevation of a sewing-machine provided with my improvements. Fig. 2 represents a top view, showing the bed partly broken away. Fig. 3 represents a section on line $x\ x$, Fig. 1. Fig. 4 represents a section on line $y\ y$, Fig. 3.

The same letters of reference indicate the same parts in all the figures.

In the drawings, $b$ represents the fixed blade which is secured to the bed of the machine, and $a$ represents the moving blade which co-operates with the fixed blade. In this instance the moving blade is rotary, as shown in Letters Patent No. 286,153, granted to me October 2, 1883, said blade being a disk or plate affixed to a positively-rotated arbor, $c$, and provided with an offset cutting-edge, which co-operates with the fixed blade once during each rotation of the arbor $c$. The fixed blade $b$ is elongated and arranged diagonally, as shown in Fig. 1, its upper end projecting through a slot in the bed or throat-plate of the machine and constituting the cutting-edge. The blade $b$ is detachably clamped or secured to a suitable seat or bearing, $e$, so that it can be moved endwise and readily removed to be sharpened or renewed. In the present instance the seat or bearing is formed on a block, $f$, attached to the supporting-base below the bed-plate and provided with diagonally-arranged guides, $i\ i$, between which the blade $b$ is adapted to slide endwise when released. The blade is clamped against its seat by a clamping-bar, $j$, secured by screws $k\ l$ to the block $f$, and adapted to be pressed at one end against the blade by said screws, and thus secure the blade rigidly to the block. When the screw is loosened, the blade is released and may be removed or adjusted.

It will be observed that the elongated blade $b$ having its cutting-edge at its end and adapted to have endwise adjustment to compensate for wear of said edge enables the blade to be used until its length is so reduced that the clamp $j$ can no longer hold it, the usefulness of the blade being thus indefinitely prolonged, while the provision of the seat and guides for the blade and the detachable clamping device enable the blade to be very readily and conveniently adjusted or removed. The facility with which the blade $b$ may be removed and applied enables the distance between the line of stitches and the trimmed edge to be varied by using a thicker or thinner blade $b$, said distance being increased by using thicker blades and vice versa. The arbor of the rotary blade is longitudinally adjustable, as described in my former patent, so that the rotary blade can be adjusted to cooperate with a fixed blade of any desired thickness. The diagonal arrangement of the blade $b$ enables it to avoid the loop forming hook $m$, and gives it a longer cutting-edge than if it were vertically arranged.

The bed-plate has a depressed portion, $n$, extending from the fixed blade a suitable distance toward the inner or right-hand edge of the bed-plate. Said depressed portion forms a receptacle for lint scraps and other débris created by the action of the trimming-blades, and allows said matter to work away from the blades and from the narrow slot through which the fixed blade $b$ extends, so that the lint, &c., is not so liable to remain near said slot and work down through the same onto the mechanism below, as when the bed-plate is level at the point where I form the depression. When the bed-plate has no depression, a slot must be provided through the plate of sufficient width to receive the moving blade $a$, as shown in my former patent, but as the depression is entirely below said blade it can be brought so close to the fixed blade $b$ as to leave only sufficient space to permit the insertion of the thickest fixed blade that is likely to be employed, said space being entirely filled when the thickest blade is employed, and being so narrow when the thinnest blade is employed that it will not permit the passage of any considerable amount of lint, &c.

It is obvious that the described improvements may be employed with a reciprocating instead of a rotary blade.

I claim—

1. In a sewing-machine, in combination with the stitch-forming mechanism and a movable blade operated by the power of the machine, a straight blade which is fixed when in operative position, edge-guides for the same, placed obliquely to the bed of the machine and attached to the frame thereof, and a separate clamp which bears on the face of the blade to hold it in adjusted position, substantially as described.

2. In a sewing-machine, the combination, with the fixed and moving blades, of the bed having a depression beside the fixed blade and under the moving blade, as set forth.

In testimony whereof I have signed my name to this specification, in the presence of two subscribing witnesses, this 11th day of February, 1884.

THOS. C. ROBINSON.

Witnesses:
C. F. BROWN,
A. L. WHITE.